United States Patent [19]

Smith

[11] 4,426,111

[45] Jan. 17, 1984

[54] AUTOMOBILE RAIN SHIELD

[76] Inventor: Samuel C. Smith, 210 Hartman Rd., Newton Centre, Mass. 02159

[21] Appl. No.: 316,325

[22] Filed: Oct. 29, 1981

[51] Int. Cl.³ .............................................. B60J 1/08
[52] U.S. Cl. ................................. 296/95 R; 296/97 R
[58] Field of Search ................ 296/201, 84 M, 91, 93, 296/97 A, 97 R, 95 R; 160/DIG. 1, DIG. 2, DIG. 3, DIG. 4

[56] References Cited

U.S. PATENT DOCUMENTS

| 2,575,660 | 11/1951 | Geidl | 296/95 R |
| 2,575,933 | 11/1951 | Thorne | 296/95 R |
| 2,599,014 | 6/1952 | Pritchard | 296/95 R |
| 2,625,358 | 1/1953 | Griffin | 296/95 R |
| 2,657,089 | 10/1953 | Kaul | 296/95 R |
| 3,415,569 | 12/1968 | Leevo | 296/97 R |
| 3,522,968 | 8/1970 | Honor, Sr. | 296/97 R |

Primary Examiner—Richard A. Bertsch

[57] ABSTRACT

There is disclosed in the present application a rain shield detachably mountable on an automobile. The shield is a preferably flat, flexible, elongated member of metal or plastic. Also disclosed, are clips or means for attaching the shield to the roof trough or side.

6 Claims, 8 Drawing Figures

AUTOMOBILE RAIN SHIELD

The present invention relates generally to shields for preventing the entry of rain through partially open windows and more particularly to such shields which are readily adapted to mounting on automobiles.

In warm humid weather, it is often desirable to be able to have the windows of automobiles partially open if air conditioning is not available. The shape of auto bodies often includes curved window glass which creates vertical paths through which rain water enters. This necessitates closing the windows with the consequence of discomfort due to deprivation of fresh air. Fresh air is very important to all occupants of the car but more particularly to the driver—especially on a long trip. Furthermore, closing the windows causes the windshield and windows to fog making it necessary to use the defogger which, at best, consumes extra energy in addition to the slowness of clearing.

Accordingly, it is an object of the present invention to prevent entry of rain in an automobile by providing a rain shield, simple in design and which may be economically manufactured in large quantities.

Another object is to prevent the entry of rain in cars having a wide variety of body styles and shapes.

A feature of the invention is to provide a rain shield which can be easily installed and detachable. This is accomplished by having a right-angled spring clip one end of which fits in the roof trough, the other, equipped with a tang designed to ride up a tapered notch leading to a dimple or depression in the shield body where the unit is secured.

Another feature is to provide a rain shield which is physically rigid yet, sufficiently flexible so as to conform to the curvature of the forward section of the roof and front post.

The foregoing objects are achieved in accordance with a feature of the present invention by a shield produced and sold in flat condition and removably mountable in an automobile of a wide variety of body styles and shapes. The shield is in the form of a relatively thin and narrow flexible strip, preferable of translucent material mountable above the automobile window which the owner is desirous of maintaining partially open during inclement weather. In accordance with a related feature, there is provided mounting hardware for attachment of the shield on the roof margin of the car.

The foregoing objects and features will be more fully appreciated from the following detailed description of an illustrative embodiment of the invention taken in connection with the accompanying drawings in which.

Figure 1:
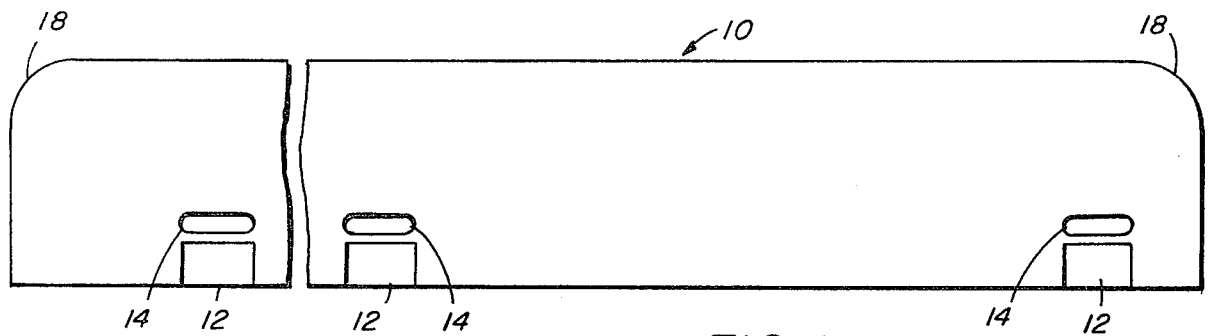
FIG. 1 is a broken plan view of the shield apparatus of this invention.
Figure 2:
FIG. 2 is a partial sectional end view of the shield apparatus illustrating the dimple and tapered notch section.
Figure 3:
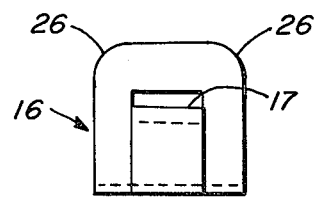
FIG. 3 is a plan view of the spring clip securing the apparatus.
Figure 4:
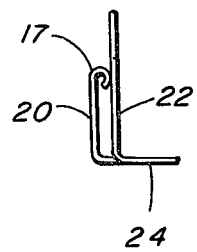
FIG. 4 is a side view of the clip securing the apparatus.

Turning now to the drawings, there is shown:

In FIGS. 1 and 2 the shield body 10 is preferably of plastic about 1¼ inches wide by 1/16 inch thick or of thin light metal of comparable width. Such a width does not present an unpleasing appearance yet allows at least 2 inches of window opening in the worst case where a slope of 6 inches between the top and bottom of the window frame (when closed) exists. FIGS. 1 and 2 further illustrate tapered notch 12 and dimple 14 to permit easy entry and locking in a cooperating clip indicated generally at 16 in FIGS. 3 and 4. The FIGS. 3 and 4 indicate the construction of the cooperating clip 16 in which a center section of a thin sheet of spring material is partially cut, separated from the main body of the sheet and formed to render a fastener or clip 16 having an upper retaining flap 20 with a closed loop 17 at the end, a lower retaining flap 22 and a limb 24. The corners of the lower retaining flap 22 contain liberal radii for safety. Fasteners are spaced at intervals of about 5 inches; hence, dimple 14 and tapered notches 12 are spaced at intervals of 5 inches. Also, dimple 14 is slightly larger than loop 17. Whereas, the tapered notch 12 and dimple 14 can be machined or thermoformed when the material, in this case, is plastic with sufficient thickness; in the case of thin sheet metal, forming of the dimple is appropriate and there is no need for the tapered notch 12. The metal shield is to be provided with preferably folded downward edge to prevent injury. Also, in the case of thin sheet metal, two different lengths are desirable to cover all cars since cutting the sheet to the correct length would not be appropriate. The only-two-different-length is adequate because an extended length of up to 5 inches is permitted in the rear section of shield 10.

Figure 5:
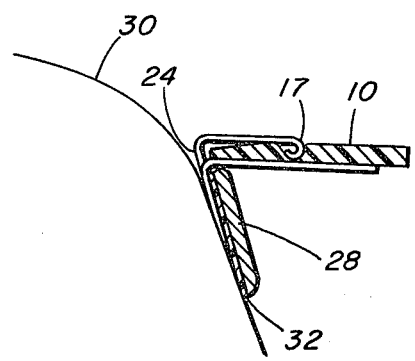
FIG. 5 is a view showing the shield assembly in mounting position.

FIG. 5 is a sectional end view showing the shield assembly in mounted position. In application, the clips 16 are first mounted in position by slipping them unto tapered notches 12 until closed loop 17 of each seats in dimple 14. Starting from the front, limb 24 is inserted behind roof trim 28 between car body 30 and pad 32. Thus installed, should subsequent removal of shield become necessary, shield 10 is pulled out, leaving the clip 16 in place. For subsequent replacing, shield 10 is pushed in between the retaining flaps 20 and 22. A strip of clear tape or a bead of silicon compound is used to seal the gap between the edge of the shield 10 and the car body 30.

Figure 6:
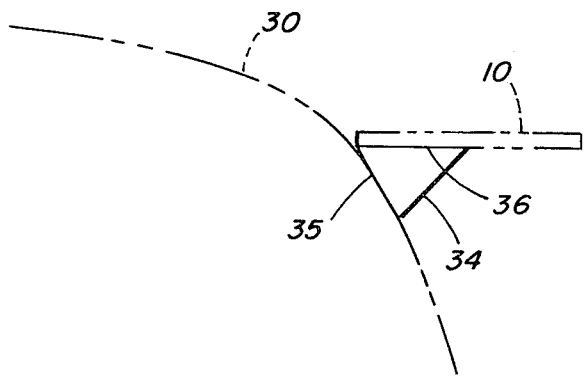
FIG. 6 is an end view of an alternate attaching device and mounting method.

FIG. 6 is an end view showing the use of a triangular-shaped magnet attachment 34. One face 36 is fastened to the underside of shield body 10 and another 35, to the body of the car. A series of the magnets 34 may be spaced at intervals as in the case of the clip 16 method. For purposes of clarity, the view of FIG. 6 shows a phantom mounting of attachment 34.

Figure 7:
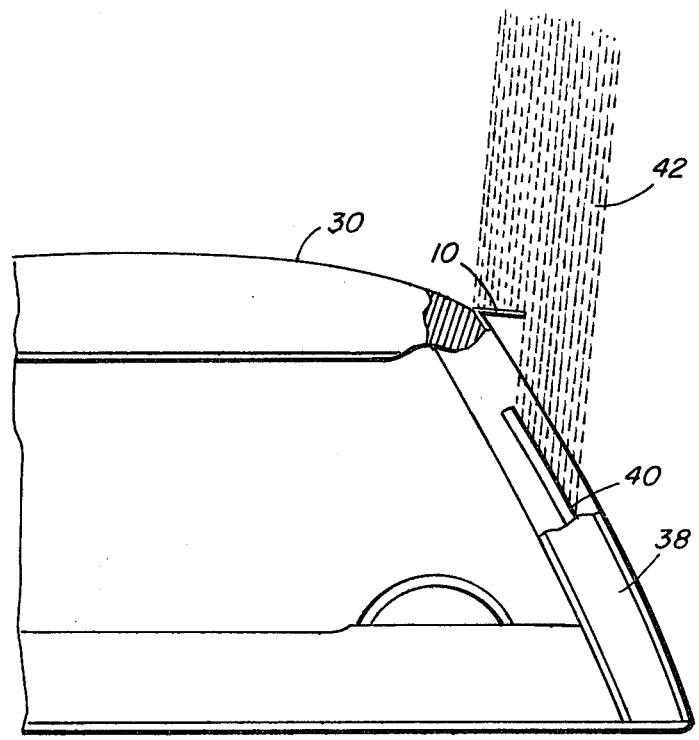
FIG. 7 is a view facing the front of a car with a partial cut-away of the front post on the driver's side and extending to the highest point of the roof.

FIG. 7 shows a portion of a typical car 30 as viewed by an observer standing in front of the car. A partial cut-away of the post 38 extending to the highest point of the margin of the roof is effected to better illustrate the effectiveness of the installed apparatus when it rains. The view indicates that with window 40 open, rainwater 42-falling at an unfavorable angle-does not enter the car; but would, without the shield 10, even under favorable condition.

Figure 8:
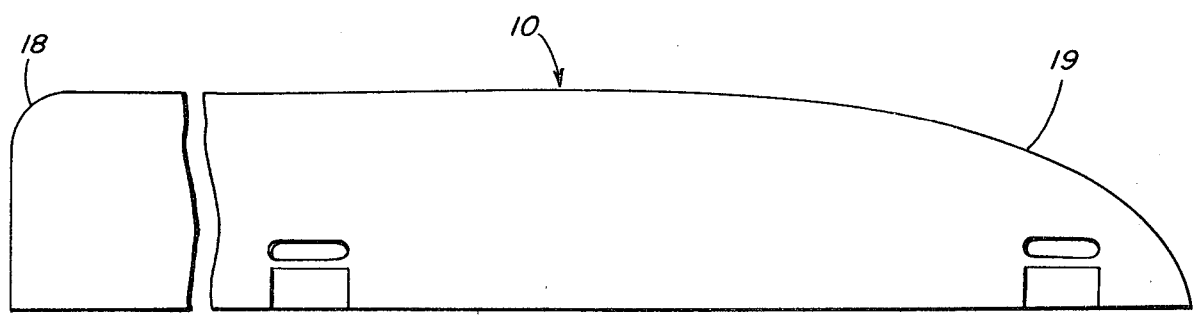
FIG. 8 is a broken plan view of a second embodiment of the shield apparatus of this invention.

The relatively small radius 18 at each end of the shield sheet 10 is intended for economy in manufacturing. Since both ends are identical, there is no need for left and right designation. An alternative is to streamline the front end with a much larger radius. In this case, shield 10 would be manufactured in left and right pairs. (See 19 in FIG. 8).

From the foregoing description of an illustrative embodiment, taken in connection with the accompanying drawings, many variations within the scope of the invention will become apparent to those of ordinary skill in the art. It is therefore not intended that the specification and drawings be taken in limiting sense but rather that the scope of the invention be interpreted in terms of the appended claims.

Having thus disclosed my invention, what I claim as new and desire to secure by Letters Patent of the United States is:

1. A removable snap-on shield assembly for preventing the entry of rain water into a vehicle interior through a partially open window of the vehicle, having a roof provided with a drip molding, wherein the shield assembly comprises:
   a relatively narrow elongated strip of flexible material comprising, at spaced intervals along one long side, portions tapering to a narrow edge, and spaced interiorly from the tapered edge, an indentation in the surface of the flexible material;
   and clip means for detachably securing the strip to the drip molding of the roof above at least one window, wherein each clip comprises a sheet of spring material formed of one piece with an angularly disposed leg for forced friction into the drip molding of the vehicle and, spaced apart from and paralled to the main body of the clip, orthogonal to the friction leg, a displaced retaining leg formed from a partially cut out section of the main body of the clip wherein the outer end of the retaining leg is rolled over in the direction of the main leg of the clip, which rolled end fits within the shield indentation to secure the shield removably in place on the vehicle when the shield snaps onto the clips with a tapered edge of the shield aligned with each clip.

2. The invention of claim 1 wherein the rain shield is secured in position with an interior long side of the shield positioned over the drip molding so that no rain passes between the drip molding and the shield.

3. A removable snap-on field assembly for preventing the entry of rain water into a vehicle interior through a partially opened window of a vehicle having a roof provided with a drip molding, wherein the shield comprises:
   a series of one-piece clamping clips forceably secured to the body of the vehicle by a friction fit in the drip molding, each clip comprising a single piece of spring material bent at an angle for forced insertion in the drip molding, wherein the portion of the clip protruding from the drip molding is partially cut and bent into two approximately parallel spaced-apart clamping arms, wherein the protruding end of one clamping arm is bent over in the direction of the opposing arm;
   and working in conjunction with the clips, a main shield comprising an elongated impermeable strip provided with indentations along one long side for interacting with the bent-over end of each clip arm removably locked in an aligned indentation of the shield.

4. The invention of claim 3 wherein, adjacent each indentation of the shield, a tapered edge of the shield serves to wedge apart the clamping arms of each clip until each bent-over end springs into the aligned indentation.

5. The invention of claim 3 wherein the clips are bent at a suffiently sharp angle to locate the interior side of the shield above the drip molding so that no water passes between the shield and the drip molding.

6. The invention of claim 3 wherein the protruding portion of each clip comprises an elongated strip having a U-shaped cut from the bent drip-molding-insertion portion with the base of the U-shaped cut parallel to and spaced inwardly of the protruding end of the elongated strip and the sides of the U-shaped cut parallel to and spaced inwardly of the sides of the elongated strip, and wherein the partially cut portion of the elongated strip located interiorly of the U-shaped cut is bent away from the exterior portion to form the two clamping arms.

* * * * *